United States Patent
Ahmadi et al.

(10) Patent No.: US 10,343,551 B2
(45) Date of Patent: Jul. 9, 2019

(54) METHODS AND APPARATUS FOR AUTOMATIC ALIGNMENT OF WIRELESS POWER TRANSFER SYSTEMS

(71) Applicant: Elix Wireless Charging Systems Inc., Vancouver (CA)

(72) Inventors: Arash Ahmadi, West Vancouver (CA); Boon Ng, Vancouver (CA)

(73) Assignee: Elix Wireless Charging Systems Inc., Vancouver (CA)

( * ) Notice: Subject to any disclaimer, the term of this patent is extended or adjusted under 35 U.S.C. 154(b) by 199 days.

(21) Appl. No.: 15/384,734

(22) Filed: Dec. 20, 2016

(65) Prior Publication Data

US 2017/0136898 A1  May 18, 2017

Related U.S. Application Data

(63) Continuation of application No. PCT/CA2015/050596, filed on Jun. 25, 2015.
(Continued)

(51) Int. Cl.
*B60L 53/38* (2019.01)
*H02J 17/00* (2006.01)
(Continued)

(52) U.S. Cl.
CPC ........... *B60L 53/38* (2019.02); *B60L 53/12* (2019.02); *B60L 53/36* (2019.02); *H01F 38/14* (2013.01); *H02J 7/025* (2013.01); *H02J 17/00* (2013.01); *H02J 50/10* (2016.02); *H02J 50/40* (2016.02); *H02J 50/90* (2016.02); *Y02T 10/7005* (2013.01); *Y02T 10/7072* (2013.01); *Y02T 90/12* (2013.01);
(Continued)

(58) Field of Classification Search
CPC .................... H02J 50/90; B60L 11/1829–1831
See application file for complete search history.

(56) References Cited

U.S. PATENT DOCUMENTS

| 5,850,135 A | * | 12/1998 | Kuki | ................... B60L 11/1805 |
| | | | | 320/108 |
| 2003/0030342 A1 | * | 2/2003 | Chen | ....................... H02J 50/90 |
| | | | | 310/102 R |

(Continued)

FOREIGN PATENT DOCUMENTS

JP    WO 2013011907 A1 *  1/2013  .......... H01M 2/1022

OTHER PUBLICATIONS

English machine translation of JP2014-187724 corresponding to disclosure of WO2013/011907 published Jan. 24, 2013.*

*Primary Examiner* — Rexford N Barnie
*Assistant Examiner* — David A Shiao
(74) *Attorney, Agent, or Firm* — Todd A. Rattray; Oyen Wiggs Green & Mutala LLP (57) ABSTRACT

A common problem in wireless charging systems in automotive applications is alignment of the wireless power transfer transmitter and receiver units. Poor alignment leads to poor power transfer capacity and a longer charging time. Costly optical sensors and electromechanical systems may be employed to align the transmitter and receiver units. A solution to this problem is to employ a freely moveable wireless power transmitter in at least one direction that is magnetically attracted to the wireless power receiver unit in the vehicle that does not require electrically powered sensors or mechanical alignment systems.

24 Claims, 6 Drawing Sheets

Related U.S. Application Data (60) Provisional application No. 62/017,077, filed on Jun. 25, 2014.

(51) Int. Cl.

| | | |
|---|---|---|
| *H02J 7/02* | (2016.01) | |
| *H02J 50/10* | (2016.01) | |
| *H02J 50/40* | (2016.01) | |
| *H02J 50/90* | (2016.01) | |
| *H01F 38/14* | (2006.01) | |
| *B60L 53/12* | (2019.01) | |
| *B60L 53/36* | (2019.01) | |

(52) U.S. Cl.
 CPC ............ *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 2008/0265684 A1* | 10/2008 | Farkas | B60L 11/005 307/104 |
| 2010/0259401 A1* | 10/2010 | Azancot | H01F 38/14 340/657 |
| 2010/0295378 A1* | 11/2010 | Suzuki | H02J 7/025 307/104 |
| 2011/0304220 A1 | 12/2011 | Whitehead | |
| 2012/0043931 A1* | 2/2012 | Terao | H02J 7/025 320/108 |
| 2013/0082535 A1 | 4/2013 | Miyauchi et al. | |
| 2013/0093259 A1* | 4/2013 | Hente | H01F 38/14 307/104 |
| 2013/0234529 A1 | 9/2013 | Miyauchi et al. | |
| 2013/0234530 A1 | 9/2013 | Miyauchi | |
| 2014/0091757 A1* | 4/2014 | Proebstle | B60L 11/182 320/108 |
| 2015/0188356 A1* | 7/2015 | Chen | H02J 7/025 320/108 |
| 2015/0214751 A1* | 7/2015 | Niizuma | B60L 11/182 307/9.1 |
| 2015/0318709 A1* | 11/2015 | Jol | H02J 5/005 307/104 |

\* cited by examiner

Figure 6

METHODS AND APPARATUS FOR AUTOMATIC ALIGNMENT OF WIRELESS POWER TRANSFER SYSTEMS

RELATED APPLICATIONS

This application is a continuation of Patent Cooperation Treaty (PCT) application No. PCT/CA2015/050596, filed 25 Jun. 2015 and entitled METHODS AND APPARATUS FOR AUTOMATIC ALIGNMENT OF WIRELESS POWER TRANSFER SYSTEMS which in turn claims the filing date benefit of U.S. application Ser. No. 62/017,077, filed on 25 Jun. 2014. PCT application No. PCT/CA2015/050596 and U.S. application No. 62/017,077 are hereby incorporated herein by reference.

TECHNICAL FIELD

The invention pertains to wireless power transfer systems which transfer power wirelessly from a wireless power transmitter to a wireless power receiver. Particular embodiments provide methods and apparatus for automatic alignment of the transmitter and receiver in such wireless power transfer systems.

BACKGROUND

Figure 1:
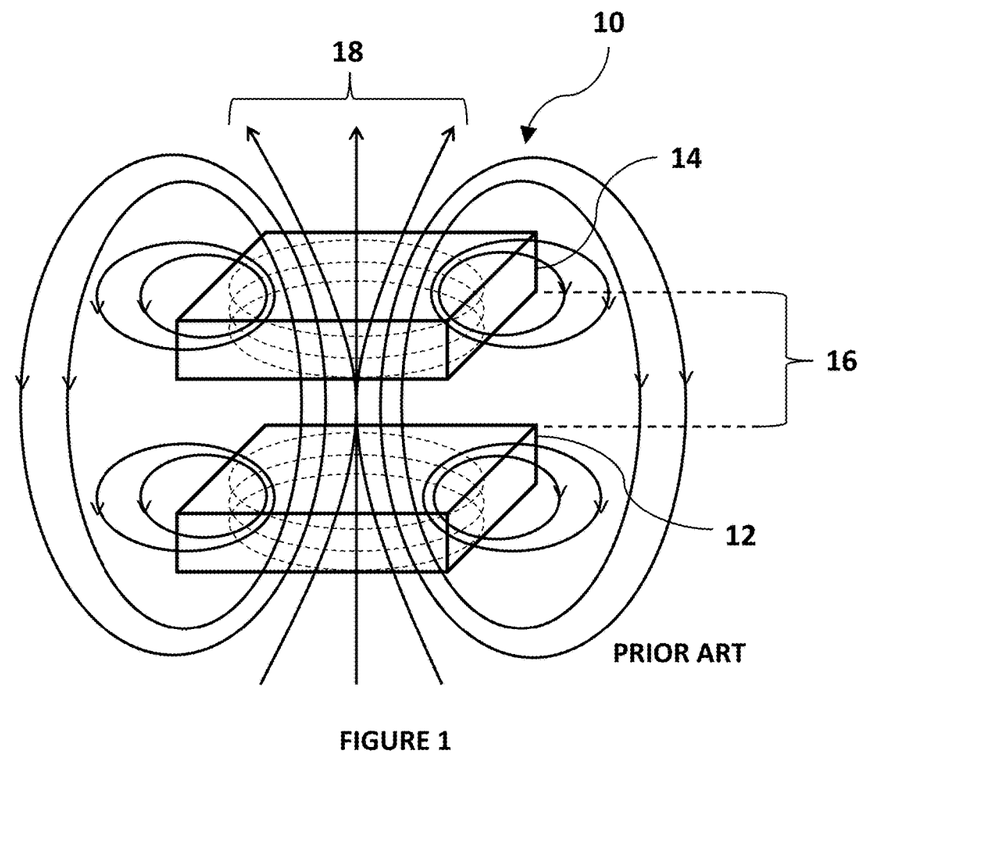
FIG. 1 is a schematic illustration of a prior art magnetic induction based WPT system comprising a WPT transmitter coil and a WPT receiver coil in close proximity.

Power can be wirelessly conveyed from one place to another using the Faraday effect, whereby a changing magnetic field causes an electrical current to flow in an electrically isolated secondary circuit. A form of wireless power transfer (WPT) currently in use involves magnetic inductive charging. One form of magnetic inductive charging is shown in WPT system 10 of FIG. 1. The FIG. 1 WPT system 10 comprises two coils 12, 14 in close proximity but separated by an air gap 16. One coil 12 of WPT system 10 acts as a wireless power transmitter and the other coil 14 acts as the receiver of wireless power. A time-varying current flows in transmitter coil 12, which produces a time-varying magnetic field (shown as flux lines in FIG. 1). This time-varying magnetic field induces current in the nearby receiver coil 14 (Faraday's law), which can then be used to charge various devices (not shown) which may be electrically connected to receiver coil 14.

Figure 2:
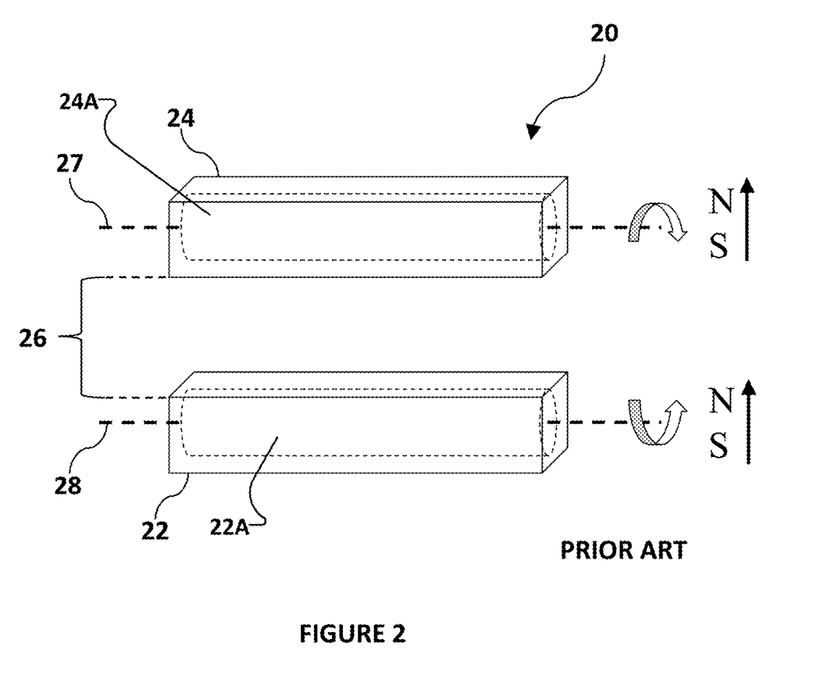
FIG. 2 is a schematic illustration of two magnetically-coupled rotating/pivoting magnets in a prior art magnetically-coupled WPT system.

In PCT application No. PCT/CA2010/000252 (published under WO/2010/096917), a magnetic-coupling technology has been described to provide a number of viable WPT systems that can be used to charge, by way of non-limiting example, batteries generally, electric (e.g. battery operated) vehicles, auxiliary batteries, electric (e.g. battery operated) buses, golf carts, delivery vehicles, boats, drones, trucks and/or the like. FIG. 2 schematically depicts a WPT system 20 incorporating a magnetic-coupling technology of the type described in PCT/CA2010/000252. WPT system 20 comprises a wireless magnetic power transmitter 22 and a wireless magnetic power receiver 24 separated by an air gap 26. The power transfer in WPT system 20 is via rotational magnetic coupling rather than via direct magnetic induction. In the FIG. 2 WPT system 20, transmitter 22 comprises a permanent magnet 22A and receiver 24 comprises a permanent magnet 24A. Transmitter magnet 22A is rotated (and/or pivoted) about axis 28. The magnetically coupled permanent magnets 22A, 24A interact with one another (magnetic poles represented by an arrow with notations of "N" for north and "S" for south in FIG. 2), such that movement of transmitter magnet 22A about axis causes corresponding movement (e.g. rotation and/or pivotal movement) of receiver magnet 24A about axis 27. The time-varying magnetic fields generated by rotating/pivoting magnets 22A, 24A of WPT system 20 typically has a lower frequency compared to WPT systems based on magnetic induction. The FIG. 2 WPT system 20 transfers power most effectively when there is strong coupling between rotating/pivoting magnets 22A, 24A.

A challenge faced by WPT systems is the alignment of the WPT transmitter and WPT receiver. When the WPT transmitter and WPT receiver are misaligned, the power transfer process loses efficiency—i.e. it takes longer to transfer a given amount of power/charge. In some cases, where misalignment is extreme, power transfer may be ineffective—i.e. no measurable power/charge transfer occurs. Alignment of the WPT transmitter and WPT receiver can be difficult, for example, in automotive applications (e.g. for charging a vehicle battery). In such applications, the WPT receiver is typically located on the underside of a vehicle (e.g. out of view of the driver of the vehicle) and a WPT transmitter is located on the ground. In such circumstances, alignment of the WPT transmitter and WPT receiver can be difficult and can reduce power transfer efficiency and/or efficacy. A number of factors can exacerbate the challenges associated with alignment of the WPT transmitters and WPT receivers. For example, such exacerbating factors may include the relatively small size of the WPT transmitters/receivers, vehicle to vehicle dimensional variations and limited capacity for the vehicle driver to see the WPT receiver and/or the WPT transmitter.

The foregoing examples of the related art and limitations related thereto are intended to be illustrative and not exclusive. Other limitations of the related art will become apparent to those of skill in the art upon a reading of the description and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides an automatically aligning wireless power transfer (WPT) system. In some embodiments, a moveably mounted wireless power transmitter (also referred to as a WPT transmitter, a wireless power transmitting unit and/or a wireless power transmitting device) comprises a transmitter magnetic system for creating a transmitter magnetic field. The WPT transmitter may be moveably mounted (e.g. mounted to a suitable support by an adjustable mounting mechanism which permits movement of the WPT transmitter relative to the support). In some embodiments, the WPT transmitter is free to move linearly (e.g. linear translational movement). In some embodiments, the WPT transmitter is free to move translationally within a plane. In some embodiments, the WPT transmitter is free to move translationally in a plane and out of the plane. In some embodiments, the WPT transmitter is additionally or alternatively free to move pivotally about one or more pivot axes. The transmitter magnetic system may comprise one or more permanent magnets and/or one or more magnetic field generating coils. The WPT system may also comprise a wireless power receiver (also referred to as a WPT receiver, a wireless power receiving unit, and/or a wireless power receiving device) which may comprise a receiver magnetic system for interacting (e.g. magnetically interacting) with the transmitter magnetic field. The receiver magnet system may comprise one or more permanent magnets and/or one or more magnetic field generating coils. Examples of such transmitter magnetic systems, receiver magnetic systems and interactions therebetween are described in PCT application No. PCT/CA2010/000252 and PCT application No. PCT/CA2015/050327, both of which are hereby incorporated herein by reference. The interaction between the transmitter magnetic field and the receiver magnetic system may cause wireless power transfer from the moveably mounted WPT transmitter to the WPT receiver and may cause movement (e.g. translational and/or pivotal movement) of the moveably mounted WPT transmitter from a first position to a second position. When the WPT transmitter is in the second position, the temporal rate of energy transfer from the WPT transmitter to the WPT receiver may be greater than the temporal rate of energy transfer from the WPT transmitter to the WPT receiver when the WPT transmitter is at the first position.

Another aspect of the invention provides a method for automatically aligning a wireless power transfer (WPT) system. The method comprises providing a moveably mounted WPT transmitter comprising a transmitter magnetic system for creating a transmitter magnetic field. The method comprises receiving a WPT receiver in a vicinity of the moveably mounted WPT transmitter, the WPT receiver comprising a receiver magnetic system for interacting with the transmitter magnetic field. The method also comprises transferring power from the moveably mounted WPT transmitter to the WPT receiver via the interaction between the receiver magnetic system and the transmitter magnetic field; and causing movement (e.g. translational and/or pivotal movement) of the moveably mounted WPT transmitter from a first position to a second position via the interaction between the receiver magnetic system and the transmitter magnetic field. When the WPT transmitter is in the second position, the temporal rate of energy transfer from the WPT transmitter to the WPT receiver may be greater than the temporal rate of energy transfer from the WPT transmitter to the WPT receiver when the WPT transmitter is at the first position.

Another aspect of the invention provides an automatically aligning wireless power transfer (WPT) system. The WPT system comprises: a wireless power transmitter (also referred to as a WPT transmitter, a wireless power transmitting unit and/or a wireless power transmitting device) moveably mounted to a support by an adjustable mounting mechanism which permits movement of the WPT transmitter (e.g. relative to the support); and a wireless power receiver (also referred to as a WPT receiver, a wireless power receiving unit, and/or a wireless power receiving device). The WPT transmitter is magnetically attracted to the WPT receiver, thereby forcing the WPT transmitter to move (e.g. translationally and/or pivotally) from a first position to a second position. In some embodiments, the WPT receiver is supported by the adjustable mounting mechanism for linear movement along a first axis. In some embodiments, the magnetic attraction of the WPT transmitter to the WPT receiver forces the WPT transmitter from the first position to the second position along the first axis. In some embodiments, the WPT receiver is supported by the adjustable mounting mechanism for linear movement along a first axis and a second axis. In some embodiments, the magnetic attraction of the WPT transmitter to the WPT receiver forces the WPT transmitter from the first position to the second position along the first and second axes. When the WPT transmitter is in the second position, the temporal rate of energy transfer from the WPT transmitter to the WPT receiver may be greater than the temporal rate of energy transfer from the WPT transmitter to the WPT receiver when the WPT transmitter is at the first position.

Another aspect of the invention provides a method for automatically aligning a wireless power transfer system. The method comprises providing a WPT transmitter supported for movement within a parking region. The method comprises receiving a WPT receiver within the parking region. The method also comprises magnetically coupling the WPT receiver to the WPT transmitter. The method also comprises forcing the WPT transmitter, by the magnetic coupling of the WPT receiver to the WPT transmitter, to move (e.g. translationally and/or pivotally) from a first position to a second position. In some embodiments, the WPT receiver is supported for linear movement along a first axis. In some embodiments, the magnetic coupling of the WPT transmitter to the WPT receiver forces the WPT transmitter from the first position to the second position along the first axis. In some embodiments, the WPT receiver is supported for linear movement along a first axis and a second axis. In some embodiments, the magnetic coupling of the WPT transmitter to the WPT receiver forces the WPT transmitter from the first position to the second position along the first and second axes. When the WPT transmitter is in the second position, the temporal rate of energy transfer from the WPT transmitter to the WPT receiver may be greater than the temporal rate of energy transfer from the WPT transmitter to the WPT receiver when the WPT transmitter is at the first position.

In some embodiments, a WPT transmitter is moveably mounted to a support (e.g. by an adjustable mounting mechanism) to permit movement of the WPT transmitter (e.g. relative to the support). A WPT receiver may be moved into the vicinity of the WPT transmitter and the WPT transmitter may be magnetically attracted to (or may otherwise interact with) the WPT receiver such that the WPT transmitter is forced to move (e.g. by translationally and/or pivotally adjusting the adjustable mounting mechanism) from a first position to a second position. In some embodiments, this force may be generated by the interaction between a transmitter magnetic field (generated by a transmitter magnetic system of the WPT transmitter) and a receiver magnetic system of the WPT receiver. When the WPT transmitter is in the second position, the temporal rate of energy transfer from the WPT transmitter to the WPT receiver may be greater than the temporal rate of energy transfer from the WPT transmitter to the WPT receiver when the WPT transmitter is at the first position.

In some embodiments, the interaction between the transmitter magnetic field and the receiver magnetic system which causes wireless power transfer from the moveably mounted WPT transmitter to the WPT receiver is stronger (e.g. relatively strong magnetic coupling generating relatively strong forces) when the WPT transmitter is in the second position as compared to when the WPT transmitter is in the first position. Accordingly, when the WPT transmitter is in the second position, the forces associated with the interaction of the transmitter magnetic field and the receiver magnetic system which cause the wireless power transfer may be greater than the forces associated with the interaction of the transmitter magnetic field and the receiver magnetic system which cause the wireless power transfer when the WPT transmitter is at the first position. When the WPT transmitter is in the second position, the WPT transmitter may be said to be closer to, or relatively more aligned with, the WPT receiver than when the WPT transmitter is in the first position. In this respect, the expressions closer, relatively more aligned with and similar terms may be understood to correspond to one or more of: a greater temporal rate of energy transfer when the WPT transmitter is in the second position relative to when the WPT transmitter is in the first position; greater magnetic coupling in the interaction between the transmitter magnetic field and the receiver magnetic system which causes wireless power transfer from the moveably mounted WPT transmitter to the WPT receiver when the WPT transmitter is in the second position as compared to when the WPT transmitter is in the first position; and greater forces in the interaction between the transmitter magnetic field and the receiver magnetic system which causes wireless power transfer from the moveably mounted WPT transmitter to the WPT receiver when the WPT transmitter is in the second position as compared to when the WPT transmitter is in the first position; and greater forces.

The moveably mounted WPT transmitter may be mounted to a support by an adjustable mounting mechanism. The adjustable mounting mechanism may comprise a linearly adjustable mounting mechanism which permits corresponding linear movement of the WPT transmitter (e.g. in one or more directions along a first linear axis) relative to the support. In some embodiments, the adjustable mounting mechanism may comprise a two-dimensionally adjustable mounting mechanism which permits corresponding two-dimensional movement of the WPT transmitter (e.g. along first and second non-parallel axes) relative to the support. The first and second non-parallel axes may be generally (e.g. within engineering tolerances) orthogonal. In some embodiments, the adjustable mounting mechanism may comprise a three-dimensionally adjustable mounting mechanism which permits corresponding three-dimensional movement of the WPT transmitter (e.g. along first, second and third generally orthogonal axes). In some embodiments, the adjustable mounting mechanism may additionally or alternative comprise a pivotally adjustable mounting mechanism which permits corresponding pivotal movement of the WPT transmitter about one or more axes (e.g. about first, second and third generally orthogonal axes). In general, the adjustable mounting mechanism may permit movement of the WPT transmitter with as many as six degrees of freedom (e.g. three translational degrees of freedom and three rotational/pivotal degrees of freedom) and any sub-combination thereof.

Another aspect of the invention provides an automatically aligning, magnetically-coupling wireless power transfer (WPT) system. The WPT system comprises: a power control device mounted in a wireless charging station for providing electrical power to a wireless power transmitting device; at least one wireless power transmitting device connected to the power control device and mounted in a parking region; a wireless power receiver mounted in a mobile platform (e.g. in a vehicle); and a mechanical structure/system (e.g. an adjustable mounting mechanism) onto which the wireless power transmitter device is further mounted such that the wireless power transmitter can move (e.g. by adjustment of the mechanical structure/system) freely (e.g. with minimal friction) in the absence of electrical power in at least one direction to align (e.g. become relatively more aligned with) with the wireless power receiver mounted in the mobile platform.

Figure 3:
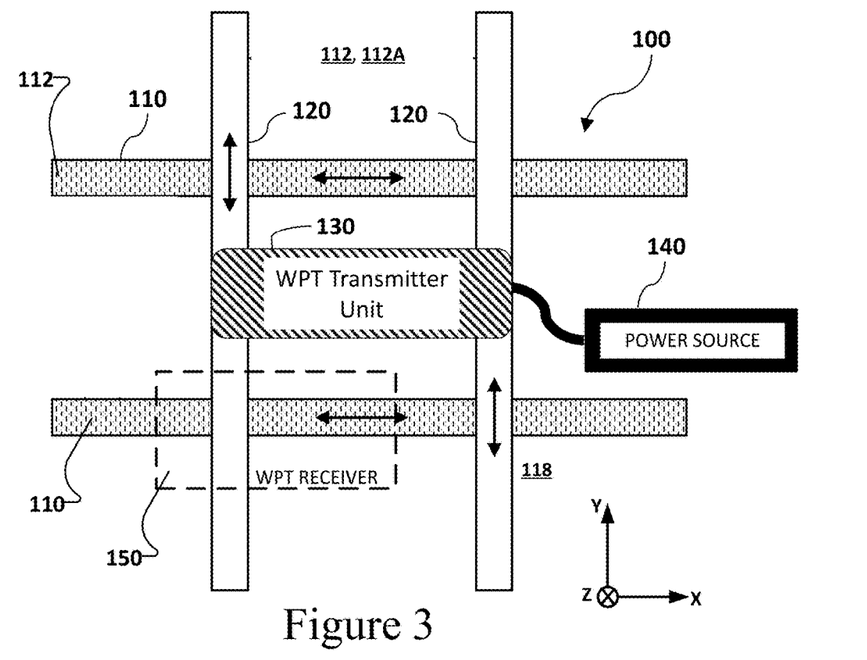
FIG. 3 schematically depicts an apparatus for automatic alignment of a WPT system according to a particular embodiment.

FIG. 3 schematically depicts an automatically aligning wireless power transfer (WPT) system 100 according to a particular embodiment. WPT system 100 comprises a moveably mounted WPT transmitter 130 for wirelessly transferring power from a power source 140 to a WPT receiver 150 (schematically shown in FIG. 3 using dashed lines). Moveably mounted WPT transmitter 130 may be moveably mounted to a support 112 by an adjustable mounting mechanism 114 which permits movement of WPT transmitter 130 in a movement region 118 (e.g. in a parking region such as a parking space). In the illustrated embodiment, support 112 comprises the ground 112A together with one or more (e.g. two) rails 110 oriented along an x-axis. In cases where movement region 118 comprises a parking region or parking space, the x-axis direction in which rails 110 are extended may comprise the short axis of the parking space which may be generally parallel to the axles of a car parked in the parking region. In general, support 112 may comprise any suitable structure (including the ground, a table, a platform, scaffolding and/or the like) relative to which adjustable mounting mechanism 114 may move.

In the illustrated embodiment, adjustable mounting mechanism 114 comprises one or more (e.g. two) rails 120 oriented along the y-axis which support WPT transmitter 130. In cases where movement region 118 comprises a parking region or parking space, the y-axis direction may comprise the long axis of the parking region which may be generally parallel to the long axis of a car parked in the parking region. The y-axis may be non-parallel to the x-axis. In some embodiments, the y-axis may be generally (within engineering tolerances (e.g. +/−2%)) orthogonal to the x-axis. Adjustable mounting mechanism 114 permits y-oriented rails 120 to move linearly along x-oriented rails 110 (e.g. y-oriented rails 120 are capable of moving linearly back and forth in directions oriented along the x-axis relative to x-oriented rails 110). Since y-oriented rails 120 support WPT transmitter 130, adjustment of y-oriented rails 120 along the x-axis causes corresponding adjustment of the position of WPT transmitter 130 in directions aligned with the x-axis relative to x-oriented rails 110. In the illustrated embodiment, adjustable mounting mechanism 114 permits WPT transmitter 130 to move linearly along y-oriented rails 120 (e.g. WPT transmitter 130 is capable of moving linearly back and forth in directions oriented along the y-axis relative to y-oriented rails 120). Together, the adjustable position of y-oriented rails (in x-axis directions relative to x-oriented rails 110) and the adjustable position of WPT transmitter 130 (in y-axis directions relative to y-oriented rails 120) permit movement of WPT transmitter 130 in two-dimensions relative to support 112 within movement region 118.

In some embodiments, rails 110, 120, the under-carriage of WPT transmitter 130 or any other part of adjustable mounting mechanism 114 may additionally or alternatively comprise tracks, guides, any other type of sliding mechanism, any other type of rolling mechanism and/or the like which permits adjustable movement of WPT transmitter 130 relative to support 112. Adjustable mounting mechanism 114 may comprise cables, guides, wheels, pulleys, gears, pistons, bearings (such as, for example, slider bearing, ball bearings, linear bearings and/or the like) and/or the like (not expressly shown in the schematic FIG. 3 illustration) to facilitate relative movement between rails 120 and rails 110. Adjustable mounting mechanism 114 may comprise any combination of such components. In some embodiments, adjustable mounting mechanism 114 may be modified to provide suitable mechanisms for providing additional degrees of freedom to the moveability of WPT transmitter 130. For example, such additional degrees of freedom may include translation in the z-axis direction and/or pivotal movement about any of the x, y and z-axes.

WPT system 100 comprises a power source 140 (also referred to as an external power control device) to provide electrical power from to WPT transmitter 130. WPT transmitter 130 may comprise a transmitter magnetic system (not expressly shown) which creates a corresponding transmitter magnetic field. For example, the transmitter magnetic system may comprise one or more permanent magnets which move with power from source 140 to create a corresponding transmitter magnetic field and/or the transmitter magnetic system may comprise one or more coils which receive current from power source 140 to generate a corresponding transmitter magnetic field. WPT receiver 150 comprises a receiver magnetic system (not expressly shown) which may comprise one or more permanent magnets and/or one or more magnetic field generating coils. The receiver magnetic system interacts (e.g. magnetically interacts) with the transmitter magnetic field. The interaction between the transmitter magnetic field and the receiver magnetic system may cause wireless power transfer from WPT transmitter 130 to WPT receiver 150. The interaction between the transmitter magnetic field and the receiver magnetic system may also cause movement of WPT transmitter 130 (via corresponding adjustment of adjustable mounting mechanism 114). In particular, magnetic interaction forces may force WPT transmitter to move from a first position to a second position.

When WPT transmitter 130 is in the second position, WPT transmitter 130 may be closer to WPT receiver 150 than when WPT transmitter 130 is in the first position. For example, in the case of the FIG. 3 schematic illustration WPT transmitter 130 may move in the negative x-direction and/or in the negative y-direction so that WPT transmitter 130 is closer to WPT receiver 150. When WPT transmitter 130 is in the second position, WPT transmitter 130 may be more aligned to WPT receiver 150 than when WPT transmitter 130 is in the first position. The temporal rate of energy transfer from the WPT transmitter to the WPT receiver may be greater when the WPT transmitter is at the second position than the temporal rate of energy transfer from the WPT transmitter to the WPT receiver when the WPT transmitter is at the first position.

Depending on the size of the magnets (and/or coils) in transmitter magnetic system of WPT transmitter 130, x-axes rails 110 may be made with x-axis lengths that are up to 2.5 times the length of the magnets and/or the axial dimensions of the coils and down to the size of the enclosure housing WPT transmitter 130. Similarly, y-oriented rails 120 may be made with y-axis lengths that are up to 4 times the width of the magnets and/or diameters of the coils and down to the size of the enclosure housing WPT transmitter 130. System 100 may be enclosed in an optional plastic or rubberized-like protective cover or hood (not shown) to protect from rain, snow, dirt or other debris or other potential means of damage to the structure.

As discussed above, in some embodiments, adjustable mounting mechanism 114 may permit WPT transmitter 130 to be moveable in directions along the z-axis (which may be orthogonal to y-axis rails 120 and x-axis rails 110 (i.e. out of the page in FIG. 3). In some embodiments, movement along the z-axis is free (e.g. with minimal friction), similar to movement along rails 110, 120, while in other embodiments, movement along the z-axis comprises manual or mechanical actuation such as by way of a motorized lift. In some embodiments, a proximity sensor is used to determine if WPT transmitter 130 is sufficiently close to WPT receiver 150 in the z-axis direction. If WPT transmitter 130 is not sufficiently close to WPT receiver 150 in the z-axis direction, then WPT transmitter 130 may be raised automatically or manually. In some embodiments, the entire illustrated system 100 is raised while in other embodiments, only WPT transmitter unit 130 is raised.

Figure 4:
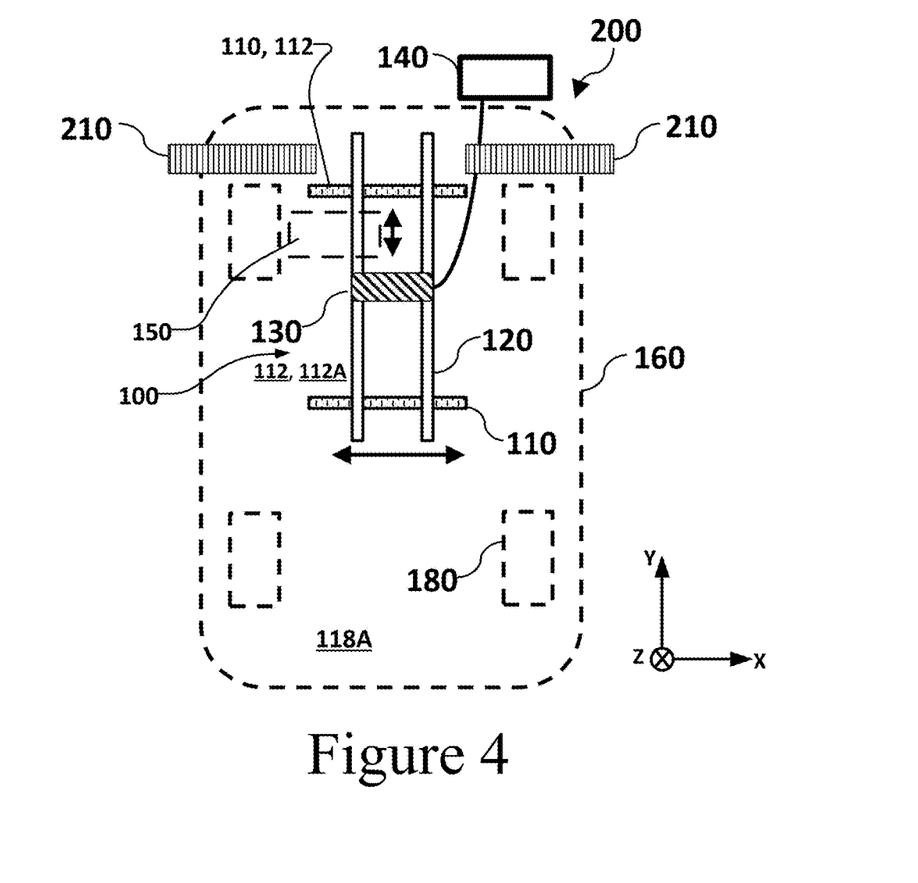
FIG. 4 schematically depicts the FIG. 3 apparatus for automatic alignment of a WPT system used as a vehicle charging system according to a particular embodiment.

FIG. 4 depicts the FIG. 3 automatically aligning wireless power transfer (WPT) system 100 in use as a vehicle charging system 200 in a parking region 118A (e.g. a parking spot) according to a particular embodiment. WPT system 100 may be the same as WPT system 100 described above in connection with FIG. 3, where support 112 comprises the surface 112A under parking region 118A and x-oriented rails 110 are rigidly mounted to surface 112A of parking region 118A. In the FIG. 4 embodiment, where WPT system 100 is used as a vehicle charging system 200, vehicle charging system 200 comprises stationary tire-stoppers 210 for stopping a vehicle in an approximately desired position in parking region 118A. By way of non-limiting example, tire stoppers 210 may comprise parking curbs and/or the like. In some embodiments, charging system 200 may comprise other components, systems or devices for stopping a vehicle in an approximately desired position in parking region 118A. By way of non-limiting example, such vehicle positioning systems may comprise proximity sensors, cameras, laser range finders, audible guides and/or the like. In the schematic illustration of FIG. 4, a vehicle 160 in parking region 118A is schematically shown in dashed lines. The tires 180 of vehicle 160 are also shown in dashed lines in the FIG. 4 illustration. In FIG. 4, vehicle 160 is shown in an idealized parking position, where the front tires 180 of vehicle 160 are immediately adjacent to tire stoppers 210.

The FIG. 4 vehicle charging system 200 functions as follows. In the absence of a vehicle 160 equipped with a WPT receiver 150, WPT transmitter unit 130 remains at rest and no charge is transferred. As a vehicle 160 equipped with a WPT receiver 150 (e.g. on its underside) approaches parking region 118A (e.g. in a vicinity of WPT transmitter 130), the transmitter magnetic system of WPT transmitter 130 creates a transmitter magnetic field which interacts (e.g. magnetically interacts) with the receiver magnetic system of WPT receiver 150. The interaction between the transmitter magnetic field and the receiver magnetic system may cause forces which cause the magnets of the transmitter magnetic system and the receiver magnetic system to rotate and align their magnetic fields such that their respective magnetic systems attract one another. Since WPT transmitter 130 can freely (e.g. with minimal friction) move in the x-axis and y-axis direction without using any additional electrical power, WPT transmitter 130 moves (e.g. by corresponding adjustment of adjustable mounting mechanism 114) from a first position to a second position. When WPT transmitter 130 is in the second position, WPT transmitter 130 may be closer to WPT receiver 150 than when WPT transmitter 130 is in the first position. When WPT transmitter 130 is in the second position, WPT transmitter 130 may be more aligned to WPT receiver 150 than when WPT transmitter 130 is in the first position. The temporal rate of energy transfer from WPT transmitter 130 to WPT receiver 150 may be greater when WPT transmitter 130 is at the second position than the temporal rate of energy transfer from WPT transmitter 130 to WPT receiver 150 when WPT transmitter 130 is at the first position.

The transmitter magnetic system may be driven with an alternating current supplied by power source 140 to create a first time-varying magnetic field that interacts with the receiver magnetic system (e.g. by inducing rotation in a magnet of the receiver magnetic system of WPT receiver 150 located in vehicle 160 across a gap) to produce a second time-varying magnetic field. This interaction between WPT transmitter 130 and the WPT receiver 150 allows power to be transferred from WPT transmitter 130 to WPT receiver 150. The transfer of power across the gap is through magnetic coupling. The second time varying magnetic field induces electrical current in coils proximate to the receiver magnetic system to provide electrical power to vehicle 160 (e.g. to the battery of vehicle 160).

Figure 5:
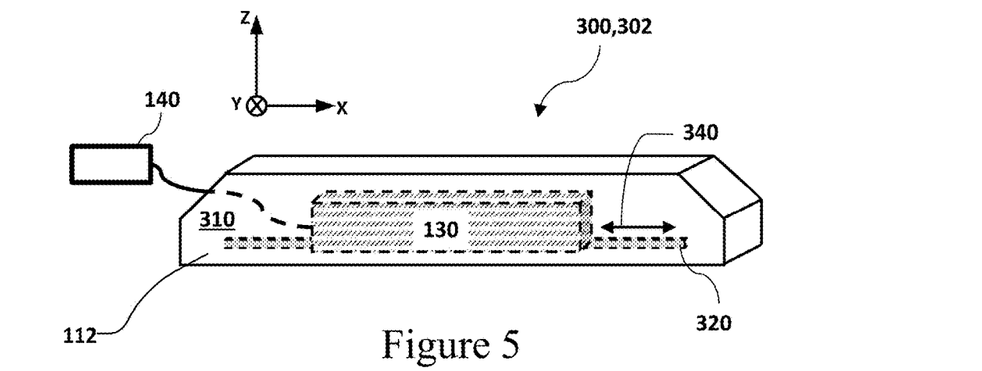
FIG. 5 depicts a close-up view of a moveable WPT transmitter installed on a parking curb according to one embodiment.

FIG. 5 depicts an automatically aligning wireless power transfer (WPT) system 300 in use as a vehicle charging system 302 adjacent to a parking curb 310 or other tire stopper 310 according to a particular embodiment. The embodiments of FIGS. 3 and 4 comprise an automatically aligning WPT system 100 where WPT transmitter 130 is moveable freely in two-dimensions to align with WPT receiver unit 150 which may be located, for example, in the underside of an approaching vehicle. In the FIG. 5 embodiment, WPT transmitter 130 is enclosed or located in proximity to a parking curb 310 or other type of tire stopper 310 which may provide part of the support 112. WPT transmitter 130 of system 300 is moveably mounted (via a adjustable mounting mechanism) to one or more stationary rails 320 extending in directions generally parallel to x-axis along parking curb 310. In the FIG. 5 embodiment, the x-axis is generally parallel to the axles of a vehicle (not shown) parked against curb 310 and the x-axis is generally perpendicular to the long axis of a vehicle parked against curb 310. Rail 320 may have any of the features discussed above in connection with rails 110, 120. A power source 140 is further connected to WPT transmitter 130 to provide electrical power to WPT transmitter 130. Parking curb 310 or other type of tire stopper 310 may be fabricated from concrete or other sturdy material such as plastic, rubber or other non-metallic material to protect system 300 from rain, snow, dirt or other debris or other potential means of damage to system 300. The functionality of system 300 may be similar to that described above in connection with systems 100, 200, except that system 300, of the illustrated embodiment, provides only one degree of freedom for movement of WPT transmitter 130.

Figure 6:
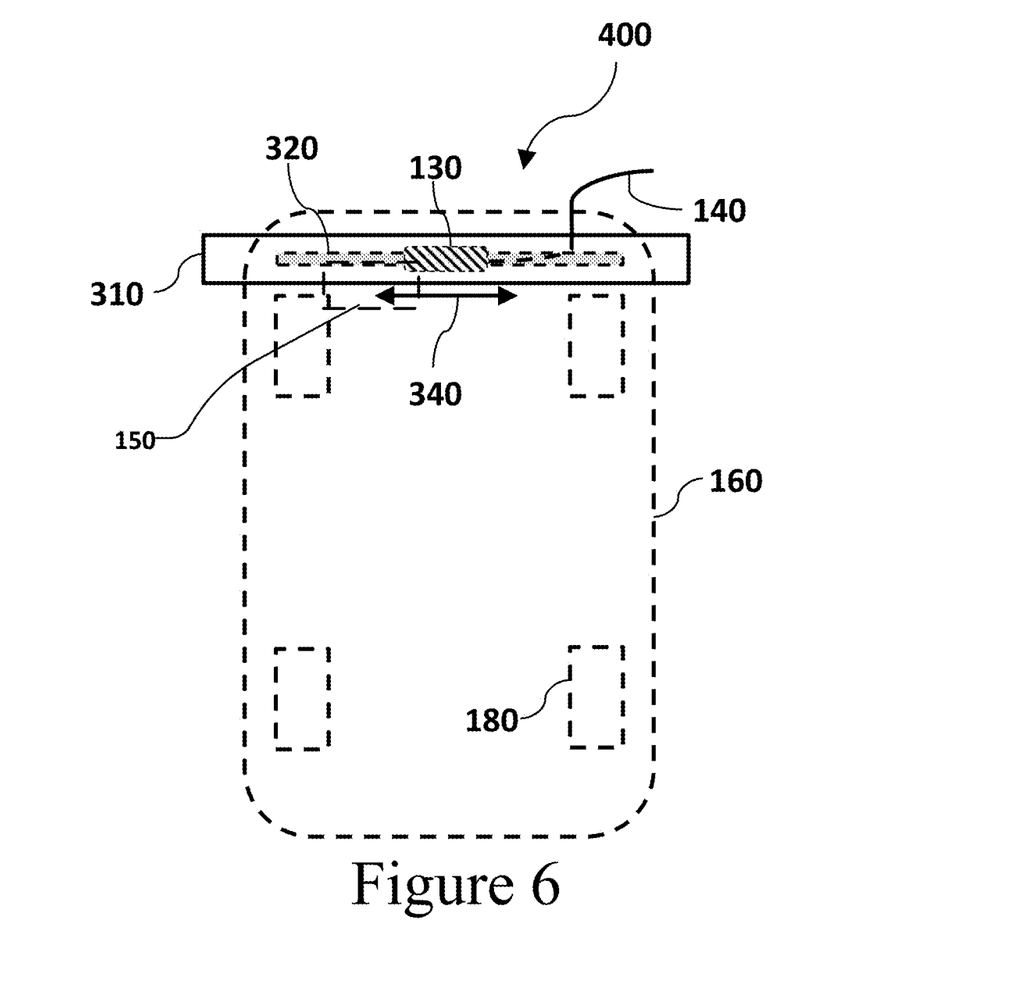
FIG. 6 depicts a close-up view of a moveable WPT transmitter installed on a parking curb according to another embodiment.

FIG. 6 depicts the FIG. 5 automatically aligning wireless power transfer (WPT) system 300 in use as a vehicle charging system 400 in a parking region 118A (e.g. a parking spot) according to a particular embodiment. WPT system 300 may be the same as WPT system 300 described above in connection with FIG. 5. In the FIG. 6 embodiment, where WPT system 300 is used as a vehicle charging system 400, vehicle charging system 400 comprises one or more stationary parking curbs 310 or other tire-stoppers 310 for stopping a vehicle in an approximately desired position in parking region 118A. Tire stopping device 310 of the FIG. 6 embodiment houses WPT system 300 and may provide part of support 112. In some embodiments, charging system 400 may comprise other components, systems or devices for stopping a vehicle in an approximately desired position in parking region 118A. By way of non-limiting example, such vehicle positioning systems may comprise proximity sensors, cameras, laser range finders, audible guides and/or the like. In the schematic illustration of FIG. 6, a vehicle 160 in parking region 118A is schematically shown in dashed lines. The tires 180 of vehicle 160 are also shown in dashed lines in the FIG. 6 illustration. In FIG. 6, vehicle 160 is shown in an idealized parking position, where the front tires 180 of vehicle 160 are immediately adjacent to curb 310.

The FIG. 6 vehicle charging system 400 functions as follows. In the absence of a vehicle 160 equipped with a WPT receiver 150, WPT transmitter unit 130 remains at rest and no charge is transferred. As a vehicle 160 equipped with a WPT receiver 150 (e.g. on its underside) approaches parking region 118A (e.g. in a vicinity of WPT transmitter 130), the transmitter magnetic system of WPT transmitter 130 creates a transmitter magnetic field which interacts (e.g. magnetically interacts) with the receiver magnetic system of WPT receiver 150. The interaction between the transmitter magnetic field and the receiver magnetic system may cause forces which cause the magnets of the transmitter magnetic system and the receiver magnetic system to rotate and align their magnetic fields such that their respective magnetic systems attract one another. Since WPT transmitter 130 can freely (e.g. with minimal friction) move in the x-axis direction without using any additional electrical power, WPT transmitter 130 moves (e.g. by corresponding adjustment of adjustable mounting mechanism 114) from a first position to a second position. When WPT transmitter 130 is in the second position, WPT transmitter 130 may be closer to WPT receiver 150 than when WPT transmitter 130 is in the first position. When WPT transmitter 130 is in the second position, WPT transmitter 130 may be more aligned to WPT receiver 150 than when WPT transmitter 130 is in the first position. The temporal rate of energy transfer from WPT transmitter 130 to WPT receiver 150 may be greater when WPT transmitter 130 is at the second position than the temporal rate of energy transfer from WPT transmitter 130 to WPT receiver 150 when WPT transmitter 130 is at the first position.

The transmitter magnetic system may be driven with an alternating current supplied by power source 140 to create a first time-varying magnetic field that interacts with the receiver magnetic system (e.g. by inducing rotation in a magnet of the receiver magnetic system of WPT receiver 150 located in vehicle 160 across a gap) to produce a second time-varying magnetic field. This interaction between WPT transmitter 130 and the WPT receiver 150 allows power to be transferred from WPT transmitter 130 to WPT receiver 150. The transfer of power across the gap is through magnetic coupling. The second time varying magnetic field induces electrical current in coils proximate to the receiver magnetic system to provide electrical power to vehicle 160 (e.g. to the battery of vehicle 160).

Embodiments of the invention described herein may be used in any magnetically-coupled wireless charging systems for, but not limited to, electric powered automobiles, transit buses, delivery vehicles, trucks, drones, boats, golf carts or other consumer devices. Particular embodiments allow for low cost and low maintenance automatic wireless charging stations of simple construction and assembly and further encourage adoption of electric vehicle technology.

As will be apparent to those skilled in the art in the light of the foregoing disclosure, many alterations and modifications are possible in the practice of this invention without departing from the spirit or scope thereof. For example:

Various embodiments (e.g. systems 100, 200, 300, 400 etc.) described herein may each include a variety of features. It should be understood that this description and the accompanying claims include additional embodiments that comprise combinations of any of the features of any of the embodiments herein.

In some instances, this description and the accompanying claims use terms generally to describe directions, orientations, shapes, relationships (e.g. equalities) and/or the like. For example, transmitter magnetic system may have a first magnetization direction that is orthogonal to a transmitter magnetization-variation direction. Such directions, orientations, shapes, relationships and/or the like should be considered to accommodate the specified directions, orientations, shapes, relationships and/or the like and/or relatively small deviations (from an operational or engineering perspective) from the specified directions, orientations, shapes, relationships and/or the like.

In some instances, this description and the accompanying claims refer to receiver magnetic systems. Where the receiver magnetic systems comprise coils, the reference to receiver magnetic system is a matter of nomenclature and doesn't necessarily mean that the receiver magnetic system driven to generate corresponding magnetic fields. In practice, the receiver magnetic system may instead have currents induced therein, which induced currents may in turn create corresponding magnetic fields.

In this description and the accompanying claims, elements (such as, by way of non-limiting example, WPT transmitters and WPT receivers) are said to overlap or align with one another in a direction or along a direction. For example, a WTP receiver may overlap or be aligned with a WPT receiver along a particular direction. When it is described that two or more objects overlap or are aligned in or along a particular direction, this usage should be understood to mean that line oriented in that particular direction could be drawn to intersect the two or more objects.

In this description, various vehicles having four wheels are described and/or depicted, however it should be understood that the invention described herein could be applied to any vehicle having any number of wheels (e.g. 1, 2, 3, 4, 5, 6 etc.) and including non-wheeled vehicles (e.g. hovercrafts, boats, planes, trains, etc.)

While a number of exemplary aspects and embodiments have been discussed above, those of skill in the art will recognize certain modifications, permutations, additions and sub-combinations thereof. It is therefore intended that the following appended aspects or claims and aspects or claims hereafter introduced are interpreted to include all such modifications, permutations, additions and sub-combinations.

What is claimed is:

1. An automatically aligning wireless power transfer apparatus, the apparatus comprising:
   a moveably mounted wireless power transmitter comprising a transmitter magnetic system for creating a transmitter magnetic field, the transmitter magnetic system comprising one or more transmitter permanent magnets;
   a wireless power receiver comprising a receiver magnetic system for interacting with the transmitter magnetic field, the receiver magnetic system comprising one or more receiver permanent magnets;
   the interaction comprising a magnetic coupling between the one or more transmitter permanent magnets and the one or more receiver permanent magnets;
   the interaction causing wireless power transfer from the moveably mounted wireless power transmitter to the wireless power receiver by movement of the one or more transmitter permanent magnets causing corresponding movement of the one or more receiver permanent magnets; and
   the interaction causing movement of the moveably mounted wireless power transmitter from a first position to a second position, the second position closer to the wireless power receiver than the first position.

2. An apparatus according to claim 1 wherein a temporal rate of energy transfer from the moveably mounted wireless power transmitter to the wireless power receiver is greater at the second position than the temporal rate of energy transfer from the moveably mounted wireless power transmitter to the wireless power receiver at the first position.

3. An apparatus according to claim 1 wherein the transmitter magnetic system comprises one or more magnetic field generating coils.

4. An apparatus according to claim 1 wherein the receiver magnetic system comprises one or more magnetic field generating coils.

5. An apparatus according to claim 1 wherein the interaction comprises a magnetic attraction.

6. An apparatus according to claim 1 wherein the moveably mounted wireless power transmitter is moveably mounted to a support by an adjustable mounting mechanism.

7. An apparatus according to claim 6 wherein the adjustable mounting mechanism comprises one or more first rails, the one or more first rails linearly elongated in a first rail direction and wherein the moveably mounted wireless power transmitter is linearly moveable relative to the one or more first rails in the first rail direction.

8. An apparatus according to claim 7 wherein the one or more first rails are mounted to one or more second rails, the one or more second rails linearly elongated in a second rail direction and wherein the one or more first rails are linearly moveable relative to the one or more second rails in the second rail direction.

9. An apparatus according to claim 8 wherein the one or more first rails comprise a pair of parallel first rails and the one or more second rails comprise a pair of parallel second rails.

10. An apparatus according to claim 8 wherein the first rail is non-parallel to the second rail direction.

11. An apparatus according to claim 8 wherein the first rail direction is orthogonal to the second rail direction.

12. An apparatus according to claim 8 wherein the adjustable mounting mechanism comprises a cable sliding system for facilitating relative movement between at least one of: the moveably mounted wireless power transmitter relative to the one or more first rails; and the one or more first rails relative to the one or more second rails.

13. An apparatus according to claim 8 wherein the adjustable mounting mechanism comprises a plurality of bearings for facilitating relative movement between at least one of: the moveably mounted wireless power transmitter relative to the one or more first rails; and the one or more first rails relative to the one or more second rails.

14. An apparatus according to claim 8 wherein the adjustable mounting mechanism comprises one or more wheels for facilitating relative movement between at least one of: the moveably mounted wireless power transmitter relative to the one or more first rails; and the one or more first rails relative to the one or more second rails.

15. An apparatus according to claim 8 wherein the adjustable mounting mechanism comprises a lift mechanism for moving the moveably mounted wireless power transmitter in a direction orthogonal to the first rail direction and the second rail direction.

16. An apparatus according to claim 6 wherein the moveably coupled wireless transmitter is rotationally fixed relative to the adjustable mounting mechanism.

17. A method for automatically aligning a wireless power transfer system, the method comprising:
    providing a moveably mounted wireless power transmitter comprising a transmitter magnetic system for creating a transmitter magnetic field, the transmitter magnetic system comprising one or more transmitter permanent magnets;
    providing a wireless power receiver in a vicinity of the moveably mounted wireless power transmitter, the wireless power receiver comprising a receiver magnetic system for interacting with the transmitter magnetic field, the receiver magnetic system comprising one or more receiver permanent magnets;
    transferring power from the moveably mounted wireless power transmitter to the wireless power receiver via the interaction between the receiver magnetic system and the transmitter magnetic field wherein the interaction comprises a magnetic coupling between the one or more transmitter permanent magnets and the one or more receiver permanent magnets, the power transfer caused by movement of the one or more transmitter permanent magnets causing corresponding movement of the one or more transmitter permanent magnets; and
    causing movement of the moveably mounted wireless power transmitter from a first position to a second position via the interaction between the receiver magnetic system and the transmitter magnetic field, the second position closer to the wireless power receiver than the first position.

18. An automatically aligning wireless power transfer system, the system comprising:
    a wireless power transmitter mounted to a support by an adjustable mounting mechanism, the adjustable mounting mechanism permitting movement of the wireless power transmitter; and
    a wireless power receiver;
    wherein one or more transmitter permanent magnets of the wireless power transmitter are magnetically attracted to one or more receiver permanent magnets of the wireless power receiver thereby forcing the wireless power transmitter from a first position to a second position, the second position closer to the wireless power receiver than the first position; and
    wherein a magnetic coupling between the one or more transmitter permanent magnets and the one or more receiver permanent magnets causes wireless power transfer from the wireless power transmitter to the wireless power receiver by movement of the one or more transmitter permanent magnets causing corresponding movement of the one or more receiver permanent magnets.

19. A system according to claim 18 wherein the adjustable mounting mechanism permits linear movement of the wireless power transmitter along a first axis and the magnetic attraction of the wireless power transmitter to the wireless power receiver forces the wireless power transmitter from the first position to the second position along the first axis.

20. A system according to claim 19 wherein the support adjustable mounting mechanism permits linear movement of the wireless power transmitter along a second axis and the magnetic attraction of the wireless power transmitter to the wireless power receiver forces the wireless power transmitter along the first and second axes from the first position to the second position.

21. A system according to claim 20 wherein the first axis is nonparallel to the second axis.

22. A system according to claim 20 wherein the first axis is orthogonal to the second axis.

23. A system according to claim 18 wherein the adjustable mounting mechanism comprises a rotating platform.

24. A system according to claim 18 wherein the wireless power transmitter and the adjustable mounting mechanism are enclosed in one of: a tire stopping device and a parking curb.

* * * * *